(12) United States Patent
Wood et al.

(10) Patent No.: US 8,694,653 B2
(45) Date of Patent: Apr. 8, 2014

(54) TARGETED DATA TRANSFER BETWEEN OPERATIONAL DOMAINS

(75) Inventors: Kevin Wood, Seattle, WA (US); Gregory M. Burgess, Redmond, WA (US); Tianchi Ma, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 12/965,630

(22) Filed: Dec. 10, 2010

(65) Prior Publication Data

US 2012/0151074 A1 Jun. 14, 2012

(51) Int. Cl.
*G06F 15/16* (2006.01)

(52) U.S. Cl.
USPC .................... 709/228; 709/229; 709/230

(58) Field of Classification Search
None
See application file for complete search history.

(56) References Cited

U.S. PATENT DOCUMENTS

| | | | |
|---|---|---|---|
| 6,982,967 B1 | 1/2006 | Leung | |
| 7,526,549 B2 | 4/2009 | Block | |
| 7,706,367 B2 | 4/2010 | Das | |
| 2002/0046262 A1 | 4/2002 | Heilig | |
| 2005/0262357 A1 | 11/2005 | Araujo | |
| 2010/0250757 A1 | 9/2010 | Akhter | |
| 2011/0310899 A1* | 12/2011 | Alkhatib et al. | 370/392 |
| 2012/0011077 A1* | 1/2012 | Bhagat | 705/317 |
| 2012/0054253 A1* | 3/2012 | Guarraci | 707/825 |

OTHER PUBLICATIONS

Author Unknown, "Clustering" Based on information and belief available, at least as early as Oct. 4, 2010, 7 pages.
Manning Publications, "How Windows Azure Works", Apr. 14, 2010, 28 pages.

* cited by examiner

*Primary Examiner* — Djenane Bayard
(74) *Attorney, Agent, or Firm* — Ben Tabor; David Andrews; Micky Minhas

(57) ABSTRACT

The present invention extends to methods, systems, and computer program products for targeted data transfer data between operational domains. Embodiments of the invention facilitate moving data between operational domains inside and outside of a resource cloud. A proxy runs on the boundary of each operational domain, such as, for example, an on premise cluster and a resource cloud. The proxies are capable of resolving the location of the targeted entity and forwarding the data or request on to the next hop, which may either be another proxy or the worker module running on the target node. A proxy can run on the head node of an on premise cluster so that compute nodes on private networks can be targeted. A proxy can also run on a public endpoint within the resource cloud to make nodes within the resource cloud available.

20 Claims, 3 Drawing Sheets

TARGETED DATA TRANSFER BETWEEN OPERATIONAL DOMAINS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premise" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources typically require an account so that the owner of the cloud resource can bill for resource usage. As such, one desiring to use cloud based resources can establish an account, including payment information (e.g., credit card information), for that purpose. Once an account is established, setting up a system within the cloud typically includes configuring at least two components, a service (computing resources) and data (storage resources).

In some computing environments, work is performed using both on premise and cloud resources. In these "hybrid" arrangements, on premise resources and cloud resources can interoperate to assist in solving a common problem. Hybrid arrangements can exist on a temporary basis, such as, for example, when one entity supplements its own resources with resources from another entity. For example, when on premise resources are operating at or near capacity, a user of the on premise resources can request allocation of cloud resources to perform additional work. When the additional work is completed, the cloud resources are returned back to an available pool of resources for allocation to other users. The user is charged for use of any allocated resources until the resources are de-allocated. That is, the user of the on premise resources essentially rents cloud resources.

Appropriate interoperation of on premise and cloud resources often requires the transfer of data between operational domains, such as, for example, between an on premise datacenter and a cloud host. However, operational details of cloud resources are often hidden within the cloud host domain. For example, cloud resources can be transient and susceptible to changes in physical address. Within the cloud, logical entities can be used to reference underlying transient nodes. However, the logical entity can be a load balancer that decides how to balance request among a number of different nodes.

Further, since these logical entities are maintained within the cloud, external systems typically have no knowledge of or mechanisms for accessing these logical entities. As a result, it can be difficult for an on premise resource to target a specific a cloud resource with any consistency. Without consistent connections, it can in turn be difficult to automate the transfer of data between on premise resources and cloud resources.

One general workaround is to upload data to and download data from (stage and destage) cloud resources prior to and in preparation for transitions into and out of a hybrid environment respectively. However, uploading and downloading data typically includes a number of manual processes. As such, uploading and downloading data in this manner is prone to human error and also delays transitions into and out of a functioning hybrid arrangement. These transition delays extend the time cloud resources are allocated to a user resulting in a corresponding financially impact to the useres.

BRIEF SUMMARY

The present invention extends to methods, systems, and computer program products for targeted data transfer data between operational domains. An on premise data transfer proxy receives a file request from a client. The file request includes a logical name and a requested file operation. The logical name targets a targeted node where the requested file operation is to be performed. The on premise data transfer proxy verifies that that the client is authorized to perform the requested file operation at the targeted node. The on premise data transfer proxy checks the logical name to determine if targeted node is a compute node or a cloud node. The on premise data transfer proxy determines that the targeted node is a cloud node within a resource cloud.

The on premise data transfer proxy opens a secure channel to a cloud-based data transfer proxy within the resource cloud. The secure channel is opened using a certificate for the resource cloud. The on premise data transfer proxy sends the file request to the cloud-based data transfer proxy for resolution of the logical name into the physical address of the targeted node. The cloud-based data transfer proxy receives the file request from the on premise data transfer proxy over the secure channel. The cloud-based data transfer proxy resolves the logical name to a physical address within the resource cloud. The cloud-based data transfer proxy sends the requested file operation to the targeted node at the physical address.

Subsequently, the file operation is implemented at the targeted node and file data is streamed between the client and the targeted node. Different file streams can be created between different components. One file stream can be used to transfer file data between the client and the on premise data transfer proxy. Another file steam can be used to transfer file data between the on premise data transfer proxy and the cloud-based data transfer proxy. A further file stream can be used to transfer data between the cloud-based data transfer proxy and the targeted node.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
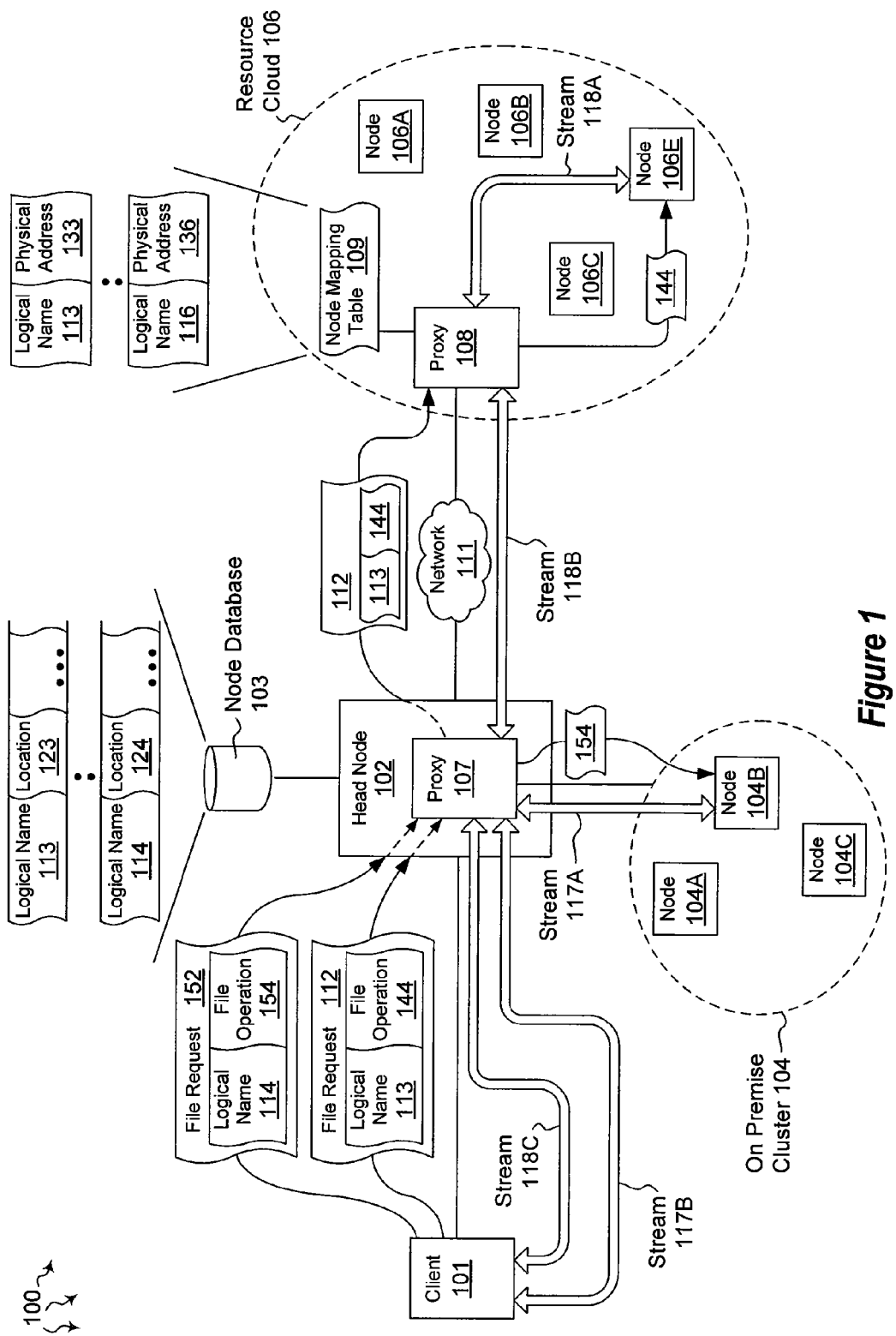
FIG. 1 illustrates an example computer architecture that facilitates targeted data transfer data between operational domains.

The present invention extends to methods, systems, and computer program products for transferring data between operational domains. An on premise data transfer proxy receives a file request from a client. The file request includes a logical name and a requested file operation. The logical name targets a targeted node where the requested file operation is to be performed. The on premise data transfer proxy verifies that that the client is authorized to perform the requested file operation at the targeted node. The on premise data transfer proxy checks the logical name to determine if targeted node is a compute node or a cloud node. The on premise data transfer proxy determines that the targeted node is a cloud node within a resource cloud.

The on premise data transfer proxy opens a secure channel to a cloud-based data transfer proxy within the resource cloud. The secure channel is opened using a certificate for the resource cloud. The on premise data transfer proxy sends the file request to the cloud-based data transfer proxy for resolution of the logical name into the physical address of the targeted node. The cloud-based data transfer proxy receives the file request from the on premise data transfer proxy over the secure channel. The cloud-based data transfer proxy resolves the logical name to a physical address within the resource cloud. The cloud-based data transfer proxy sends the requested file operation to the targeted node at the physical address.

Subsequently, the file operation is implemented at the targeted node and file data is streamed between the client and the targeted node. Different file streams can be created between different components. One file stream can be used to transfer file data between the client and the on premise data transfer proxy. Another file steam can be used to transfer file data between the on premise data transfer proxy and the cloud-based data transfer proxy. A further file stream can be used to transfer data between the cloud-based data transfer proxy and the targeted node.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates targeted data transfer data between operational domains. Referring to FIG. 1, computer architecture 100 includes client 101, head node 102, node database 103, on premise cluster 104, network 111, and resource cloud 106. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

On premise cluster 104 can include a cluster of computer systems, such as, for example, nodes 104A, 104B, and 104C, configured to interoperate with one another and aggregate resources together to solve (e.g., different portions of larger an/or more complex) computations that would potentially overburden a single computer system. The cluster of computer systems can include a plurality of computer systems, such as, for example, 10s or ever 100s of computer systems, having computational and storage resources.

A user at client 101 can enter commands to head node 102 to utilize resources of on premise cluster 104. From time to time, the customer may also desire to use computation and storage resources in resource cloud 106 (e.g., to supplement the use of on premise cluster 104), such as, for example, at any of nodes 106A, 106B, 106C, and 106E. To establish a relationship between customer premise with resource cloud 106, the customer can register for a subscription with a management infrastructure for resource cloud 106. In response, the management infrastructure can return account data to the customer. The management infrastructure can also store account data along other credentials, for example, a storage credential (e.g., a storage encryption key) in an account database.

A storage credential can be used to access storage resources for the customer in resource cloud 106. Account data can include one or more of a subscription ID, a service account name, a storage account name, and a certificate for the customer. To facilitate the performance of work in resource cloud 106, the customer can enter commands at client 101, which are used to configure and control the use of resources in resource cloud 106.

Head node 102 includes proxy 107. Head node 102 can also include a scheduler that allocates work to designated resources. Upon receiving a command, such as, for example, a file request, proxy 107 can determine if the command is targeted to a node in on premise cluster 104 or is targeted to a node in resource cloud 106. Upon receiving a command, proxy 107 can refer to node database 103. Node database 103 can include a table that contains node data for each node. The node data can maps logical names for nodes to locations of the nodes. For example, logical name 113 maps to location 123, location name 114 maps to location 124, etc.

For nodes within on premise cluster 104, a logical name can map to a location identifying on premise cluster 104 and a physical address within on premise cluster 104. For example, location 124 can identify node 104C. For nodes within resource cloud 106, a logical name maps to proxy 108. For example, location 123 can identify proxy 108. Proxy 108 can run on a public endpoint to make nodes within resource cloud 106 available.

Further, head node 102 can operate as a head node for one or more other on premise clusters (not shown) and/or one or more other resource clouds (not shown). In these embodiments, a location can differentiate between nodes within different on premise clusters and/or between proxies within different resource clouds. That is, there may be a plurality of on premise clusters and/or a plurality of resource clouds. Node database 103 can contain location information with sufficient specificity to distinguish between any of the plurality of on premise clusters and/or resource clouds. Thus, proxy 107 can use node database 103 to appropriately route user commands (e.g., file requests) targeted to nodes in any on premise cluster or any resource cloud.

Accordingly, upon receiving a command, such as, for example, a file requests, proxy 107 parses a logical name out of the command. Proxy 107 attempts to match the parsed logical name to a logical name in node database 103. Upon identifying a match, proxy 107 identifies the corresponding location and routes the command to the corresponding location. Thus, when a logical name maps to a node in on premise cluster 104, proxy 107 routes a received command to the node within on premise cluster 104. On the other hand, when a logical name maps to proxy 108 (or in general to a node in resource cloud 106), proxy 107 routes the command to proxy 108.

Within resource cloud 106, node mapping table 109 can map logical names for nodes to physical addresses of the nodes. For example, logical name 113 is mapped to physical address 133, logical name 116 is mapped to physical address 136, etc. Thus, within resource cloud 106, node mapping table 109 can be used to resolve a logical name to a physical address. As such, proxy 108 can use node mapping table 109 to appropriately route user commands (e.g., file requests) targeted to nodes within resource cloud 106.

Upon receiving a command (e.g., a file operation), proxy 108, parses a logical name out of the command. Proxy 108 attempts to match the parsed logical name to a logical name in node mapping table 109. Upon identifying a match, proxy 108 identifies the corresponding physical address and routes the command to the corresponding physical address. For example, physical address 133 can correspond to the logical name for node 106D.

In some embodiments, client 101 includes a command line interface (or a more sophisticated graphical user interface) for entering commands. For example, client 101 can include an interface for entering file requests, such as, for example, copy, move, delete, directory, etc. When moving or copying a file, the command can include a path at client 101 and a path at the targeted node. For example, the command "copy C:\root\file001.cfg cloud_node_z\opsdata\file001.cfg can copy the file001.cfg from the directory \root of drive C: at client 101 to the directory opsdata at cloud_node_z. Similarly, the command "move cluster_node_A\opsdata\rev1\fileA.cfg D:\cfgbackup" moves the file fileA.cfg from the directory \opsdata\rev1 at cluster_node_A to the directory cfgbackup of disk D: at client 101.

When deleting a file, the command can include a path to the file. For example, the command "delete cloud_node_u\userdata\userfile001" can delete the file userfile001 from the \userdata directory at cloud_node_u. Similar, when view directory information a command can include a path to the directory. For example, the command "dir cluster_node_v\system\configuration" returns a listing of files and other directories in the \system\configuration directory of cluster_node_v.

When processing file commands, once a file command reaches the targeted node, one or more file streams can be created between the targeted node and client 101 to transfer file data. In some embodiments, file streams can be created on a per hop basis. For example, to transfer file data from a cloud node (in resource cloud 106) to client 102, one stream can be created between the cloud node and proxy 108, another stream can be created from proxy 108 to 107, and a further proxy can be created from proxy 107 to client 101. Alternately, to transfer file data from a cluster node (in on premise cluster 104) to client 102, one stream can be created between the cluster node and proxy 107 and another stream can be created from proxy 107 to client 101.

File data can be transferred across individual file streams in accordance with the characteristics of the networks over which the individual file streams are created. Thus, file streams can transfer file data at different rates and/or in accordance with different network characteristics.

Figure 2:
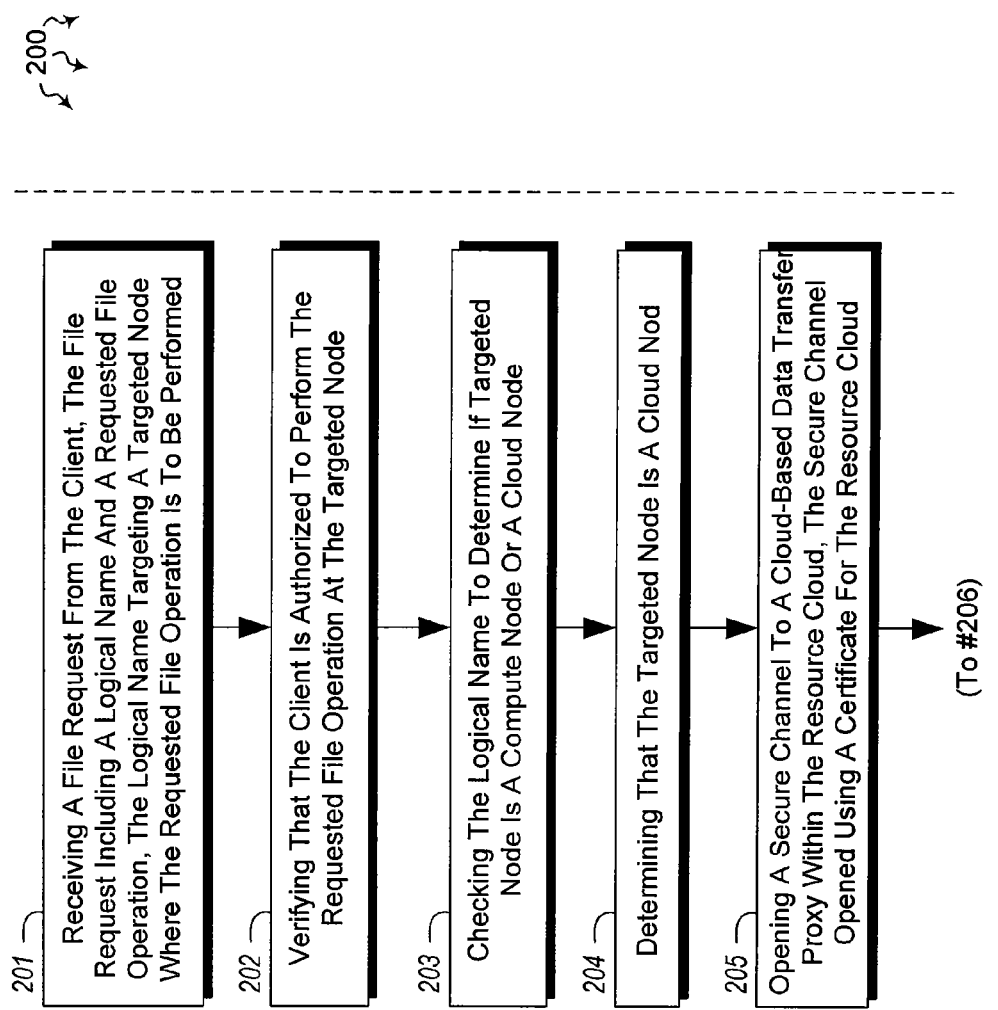
FIG. 2 illustrates a flow chart of an example method for targeted data transfer data between operational domains.
Figure 2:
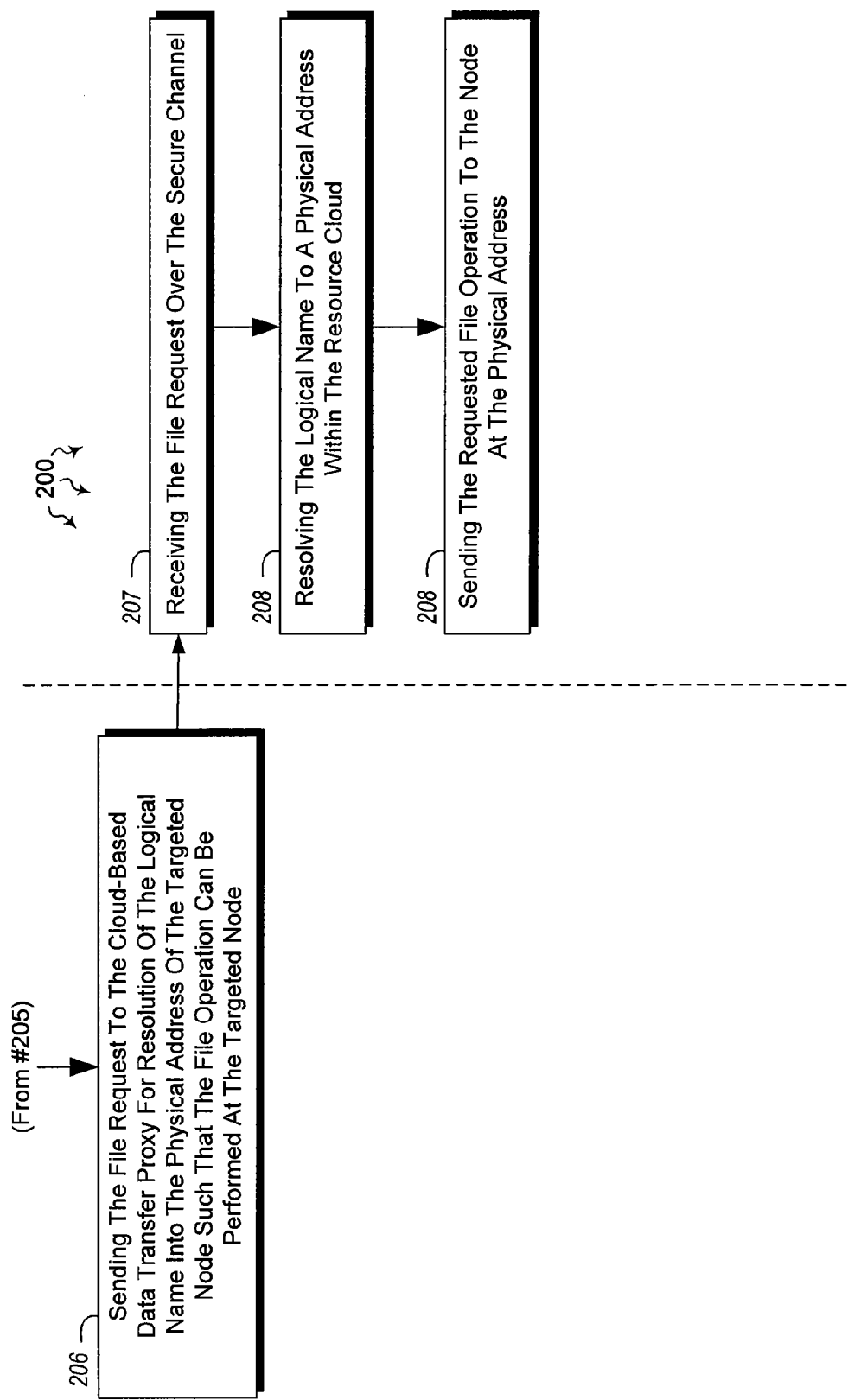

FIG. 2 illustrates a flow chart of an example method 200 for targeted data transfer data between operational domains. Method 200 will be described with respect to the components and data of computer architecture 100.

Method 200 includes an act of receiving a file request from the client, the file request including a logical name and a requested file operation, the logical name targeting a targeted node where the requested file operation is to be performed (act 201). For example, proxy 107 can receive file request 112 from client 101. File request 112 is a request to perform file operation 144 (e.g., copy, move, delete, directory, etc.) at a targeted node identified by logical name 113.

Method 200 includes an act of verifying that the client is authorized to perform the requested file operation at the targeted node (act 202). For example, proxy 107 can verify that client 101 is authorized to perform file operation 144 at the targeted node identified by logical name 113.

Method 200 includes an act of checking the logical name to determine if targeted node is a compute node or a cloud node (act 203). For example, proxy 107 can check logical name 113 to determine if the targeted node is in on premise cluster 104 or in resource cloud 106. Method 200 includes an act of determining that the targeted node is a cloud node (ac 204). For example, proxy 107 can determine that the targeted node is a node within resource cloud 106. Proxy 107 can parse logical name 113 from file request 112. Proxy 107 can compare logical name 113 to entries in node database 103 to match logical name 113 to location 123. Location 123 can identify proxy 108.

Method 200 includes an act of opening a secure channel to a cloud-based data transfer proxy within the resource cloud, the secure channel opened using a certificate for the resource cloud (act 205). For example, proxy 107 can open a secure channel to proxy 108 over network 111. The secure channel can be opened using a certificate for resource cloud 106.

Method 200 includes an act of sending the file request to the cloud-based data transfer proxy for resolution of the logical name into the physical address of the targeted node such that the file operation can be performed at the targeted node (act 206). For example, proxy 107 can send file request 112 to proxy 108 for resolution of logical name 113 into the physical address of the targeted node. Method 200 includes an act of receiving a file request from the on premise data transfer proxy over a secure channel (act 207). For example, proxy 108 can receive file request 112 from proxy 107 over the secure channel.

Method 200 includes an act of resolving the logical name to a physical address within the resource cloud (act 208). For example, proxy 108 can parse logical name 113 from file request 112. Proxy 108 can compare logical name 113 to entries in node mapping table 109 to match logical name 113 to physical address 133 (e.g., an IP address). Physical address 133 can be the physical address of node 106E. Method 200 includes an act of sending the requested file operation to the targeted node at the physical address (act 209). For example, proxy 108 can send file operation 144 to node 106E.

Subsequent to sending file operation 144 to node 106E, stream 118A can be established between node 106E and proxy 108 to transfer file date between node 106E and proxy 108. Stream 118B can also be established between proxy 108 and proxy 107 to transfer file data between proxy 108 and 107. Stream 118C can also be established to transfer file data between proxy 107 and client 101. File data can then be transferred over the established file streams to implement file operation 144 at node 106E.

Embodiments of the invention used to bypass the default functionality of load balancing algorithms used within resource cloud 106. For example, proxy 108 can be established as a single instance such that load balancing algorithms direct communication to proxy 108. As such, proxy 108 can then control how messages are allocated to nodes 106A, 106B, 106C, and 106E.

In other embodiments, proxy 107 determines that a target node is within on premise cluster 104. For example, proxy 107 can receive file request 152 from client 101. File request 152 is a request to perform file operation 154 (e.g., copy, move, delete, directory, etc.) at a targeted node identified by logical name 114. Proxy 107 can verify that client 101 is authorized to perform file operation 154 at the targeted node identified by logical name 114.

Proxy 107 can check logical name 114 to determine if the targeted node is in on premise cluster 104 or in resource cloud 106. Proxy 107 can determine that the targeted node is a node within on premise cluster 104. Proxy 107 can parse logical name 114 from file request 152. Proxy 107 can compare logical name 114 to entries in node database 103 to match logical name 114 to location 124. For example, location 124 can identify node 104B. In response, proxy 107 can send file operation 154 to node 104B.

Subsequent to sending file operation 154 to node 104B, stream 117A can be established between node 104B and proxy 107 to transfer file date between node 104B and proxy 107. Stream 117B can also be established to transfer file data between proxy 107 and client 101. File data can then be transferred over the established file streams to implement file operation 154 at node 104B.

In some embodiments, head node 102 is part of a High Performance Computing ("HPC") component. As such, work submitted for execution (to on premise cluster 104 and/or to resource cloud 106) can be part of scientific or other computationally intensive operations. In these embodiments, transferred data can be HPC operational data and/or HPC binary code. Based on HPC operational data and HPC binary code, HPC services can be run in on premise cluster 104 and/or resource cloud 106. HPC services can include queues for accepting units of HPC work, mapping tables to track machines, etc.

Accordingly, embodiments of the invention facilitate moving data between operational domains inside and outside of a resource cloud. A proxy runs on the boundary of each operational domain, such as, for example, an on premise cluster and resource cloud. The proxies are capable of resolving the location of the targeted entity and forwarding the data or request on to the next hop, which may either be another proxy or the worker module running on the target node. A proxy can run on the head node of an on premise cluster so that compute nodes on private networks can be targeted. A proxy can also run on a public endpoint within the resource cloud to make nodes within the resource cloud available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At computer system including one or more processors and system memory, the computer system within a customer premise and connected to a cluster of compute nodes, the computer system including a head node for the cluster of compute nodes, the head node connected to a client and to a resource cloud, the resource cloud including one or more cloud nodes, the head node including an on premise data transfer proxy, a method for targeted data transfer between the client and the resource cloud, the method comprising:
    an act of receiving a file request from the client, the file request including a logical name and a requested file operation, the logical name targeting a targeted node where the requested file operation is to be performed;
    an act of verifying that the client is authorized to perform the requested file operation at the targeted node;
    an act of checking the logical name to determine if targeted node is a compute node or a cloud node;
    an act of determining that the targeted node is a cloud node;
    an act of opening a secure channel to a cloud-based data transfer proxy within the resource cloud, the secure channel opened using a certificate for the resource cloud; and
    an act of sending the file request to the cloud-based data transfer proxy for resolution of the logical name into the physical address of the targeted node such that the file operation can be performed at the targeted node.

2. The method as recited in claim 1, further comprising subsequent to sending the file request to the cloud-based data transfer proxy:
    an act of establishing a first file stream between the on premise data transfer proxy and the cloud based proxy; and
    an act of establishing a second file stream between the on premise data transfer proxy and the client.

3. The method as recited in claim 2, further comprising, subsequent to establishing the first file stream, an act of transferring file data between the on premise data transfer proxy and the cloud based proxy on the first file stream to implement the file operation at the targeted node.

4. The method as recited in claim 2, further comprising, subsequent to establishing the first file stream, an act of transferring file data between the on premise data transfer proxy and the client on the second file stream to implement the file operation at the targeted node.

5. The method as recited in claim 1, wherein the act of receiving a file request from the client comprises an act of receiving a file request that includes a file operation selected from among: copy, move, delete, and directory.

6. The method as recited in claim 5, wherein the act receiving a file request comprises an act of receiving a file request that includes a file operation for transferring data from the client to the targeted node.

7. The method as recited in claim 5, wherein the act receiving a file request comprises an act of receiving a file request that includes a file operation for transferring data from the targeted node to the client.

8. The method as recited in claim 1, wherein the act of receiving a file request comprises an act of receiving file request that was entered at a command line interface at the client.

9. At computer system including one or more processors and system memory, the computer system within a resource cloud, the computer system including a cloud-based data transfer proxy, the computer system connected to a head node for a cluster of compute nodes within a customer premise, the head node connected to a client and including an on premise data transfer proxy, a method for targeted data transfer between the client and the resource cloud, the method comprising:
    an act of receiving a file request from the on premise data transfer proxy over a secure channel, the secure channel having been opened using a certificate for the resource cloud, the file request including a logical name and a requested file operation, the logical name targeting a targeted node within the resource cloud where the file operation is to be performed, the request having originated at a client connected to the head node;
    an act of resolving the logical name to a physical address within the resource cloud; and
    an act of sending the requested file operation to the targeted node at the physical address.

10. The method as recited in claim 9, wherein the act of receiving a file request from the on premise data transfer proxy comprises an act of receiving a file request containing a file operation selected from among: copy, move, delete, and directory.

11. The method as recited in claim 9, wherein the act of resolving the logical name to a physical address within the resource cloud comprises an act of referring to a node mapping table that maps logical names to physical addresses.

12. The method as recited in claim 9, wherein the act of resolving the logical name to a physical address within the resource cloud comprises an act of resolving the logical name to an Internet Protocol ("IP") address.

13. The method as recited in claim 9, further comprising, subsequent to sending the requested file operation to the targeted node, an act of establishing a file stream between the targeted node and the cloud based proxy.

14. The method as recited in claim 13, further comprising, subsequent to establishing the file stream, an act of transferring file data between the targeted node and the cloud based proxy on the file stream to implement the file operation at the targeted node.

15. The method as recited in claim 5, wherein the act receiving a file request comprises an act of receiving a file request that includes a file operation for transferring data from the client to the targeted node.

16. The method as recited in claim 5, wherein the act receiving a file request comprises an act of receiving a file request that includes a file operation for transferring data from the targeted node to the client.

17. One or more hardware storage devices for use at computer system, the computer system within a customer premise and connected to a cluster of compute nodes, the computer system including a head node for the cluster of compute nodes, the head node connected to a client and to a resource cloud, the resource cloud including one or more cloud nodes, the head node including an on premise data transfer proxy, the computer program product for implementing a method for targeted data transfer between the client and the cluster of compute nodes, the one or more hardware storage devices having stored thereon computer-executable instructions that, when executed at a processor, cause the computer system to perform the method, including the following:
 receive a file request from the client, the file request including a logical name and a requested file operation, the logical name targeting a targeted node where the requested file operation is to be performed;
 verify that the client is authorized to perform the requested file operation at the targeted node;
 refer to a node database to map the logical name to the location of the targeted node;
 determine that the location of the targeted node is a compute node in the on premise cluster; and
 send the requested file operation to the compute node in the on premise cluster.

18. The one or more hardware storage devices as recited in claim 17, further comprising computer-executable instructions that, when executed at a processor, cause the computer system to:
 establish a first file stream between the compute node in the on premise cluster and the on premise data transfer proxy subsequent to sending the file operation to the compute node in the on premise cluster; and
 establish a second file stream between the on premise data transfer proxy and the client subsequent to sending the file operation to the compute node in the on premise cluster.

19. The one or more hardware storage devices as recited in claim 18, further comprising computer-executable instructions that, when executed at a processor, cause the computer system to transfer file data between the compute node in the on premise cluster and the on premise data transfer proxy to implement the file operation at the compute node in the on premise cluster.

20. The one or more hardware storage devices as recited in claim 18, further comprising computer-executable instructions that, when executed at a processor, cause the computer system to transfer file data between the on premise data transfer proxy and the client on the second file stream to implement the file operation at the compute node in the on premise cluster.

* * * * *